Patented July 17, 1928.

1,677,731

UNITED STATES PATENT OFFICE.

CARL SAUTERMEISTER, OF WIESBADEN, GERMANY, AND FRIEDRICH WILHELM, OF PLOESTI, RUMANIA.

PROCESS OF WORKING UP ACID RESINS OBTAINED FROM THE REFINING OF MINERAL-OIL DERIVATIVES INTO NEUTRAL BITUMENS.

No Drawing. Application filed December 19, 1925, Serial No. 76,552, and in Rumania June 30, 1925.

This invention relates to a process of working up acid resins, obtained from the refining of mineral oil derivatives, into neutral bitumens.

Many experiments have heretofore been conducted with the end in view of utilizing the acid-tars obtained in connection with the refining of mineral oil derivatives. The acid-tars are formed in the refining of mineral oil derivatives, with sulphuric acid and even in moderate sized plants reach quite considerable amounts which, hitherto, were disposed of in special pools, for example. Known processes have been confined almost entirely to washing with water or to neutralizing with different known agents such as caustic soda and lime, and then burning by means of special grates, or washing out as much sulphuric acid as possible with or without the addition of combustible oil.

In order to obviate these disadvantages, according to the present invention we provide a process for working up into neutral bitumen the acid resins produced, in order to secure a final product which is equally adapted for use in street paving, in production of roof boards and insulating material free from resins, for the manufacture of varnish and bricquet resin as well as for the generation of liquid asphalt and the production of waterproof bitumen.

The new process is characterized in that the sulphuric acid still contained in the raw extracted acid-resins after refining, is reduced with sulphuretted hydrogen, in which process the sulphuretted hydrogen is either introduced into the bitumen or produced directly in the mass itself by the addition of sulphur.

The present process is based on the reduction of the sulphuric acid, which, as is known, still remains in fairly important quantities in the acid-tars after a rough extraction. The reduction itself is carried out with sulphuretted hydrogen, and produces sulphur and water and possibly some sulphur dioxide ($SO_2$), the formula being as follows:—

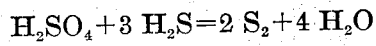

$$H_2SO_4 + 3 H_2S = 2 S_2 + 4 H_2O$$

The sulphur thus produced, at the same time, reacts to harden the hydrocarbons of the acid resins.

In practice, the process is carried on somewhat as follows:—

The raw acid-tars are placed in vessels or boilers, which are known in the petroleum industry as agitators, and in which the acid-tars are extracted by heating with steam or by direct firing. At this point, a part of the sulphuric acid is separated and can be removed.

As the sulphuric acid remaining in the acid-tar is reduced to sulphur which, in its turn, exercises a hardening effect on the hydrocarbons, a considerable quantity of free sulphuric acid may remain in order to form more sulphur. By measuring the sulphuric acid remaining in the acid resins after extraction, the hardness of the bitumen to be finally produced can be controlled at will and in accordance with the desired qualities of the final product.

By the addition of residue of distilled petroleum of a somewhat high boiling point the penetration of the final product (bitumen) can be regulated at will so far as necessary.

The tar is heated after extraction, for the concentration of the sulphuric acid; as soon as the temperature has risen to about 130° C. in accordance with the invention, sulphuretted hydrogen is introduced into the acid-tar.

In a modified process sulphuretted hydrogen gas can be generated in the tar by the addition of a small quantity of sulphur, which latter unites with the hydro-carbons of the acid-tars, to form sulphuretted hydrogen. The quantity of sulphur used for this purpose may be small, as at the moment of the formation of sulphuretted hydrogen a corresponding quantity of sulphuric acid is reduced so that once more free sulphur is produced, which in statu nascendi reacts anew on the hydrocarbons.

The process forming the subject of the present invention is cyclic and only ends when the whole of the sulphuric acid is reduced and a bitumen of complete neutrality has been formed which is adapted for the uses set forth above. The complete reduction of the sulphuric acid can be recognized when the frothing, which goes on briskly during the whole process, ceases. When the frothing is over a so-called "mirror" with a smooth shining surface is formed, and the bitumen generated is very shiny and possesses great length of fibre (i. e. ductility). Of course it is possible to carry out the process in other ways within the scope of the invention and the process described is only given by way of example of the working.

Having now fully described our invention what we claim and desire to secure by Letters Patent is:—

1. A process of working up acid resins, obtained from the refining of mineral oil derivatives, into neutral bitumens, consisting in heating the acid-tar, agitating the same to separate the sulphuric acid from the tar, removing the sulphuric acid, heating the tar in order to concentrate the sulphuric acid remaining, continuing the heating up to about 130° C., and thereafter introducing sulphur into the tar so as to form sulphuretted hydrogen which reduces the sulphuric acid.

2. A process of working up acid resins, obtained from the refining of mineral oil derivatives, into neutral bitumens, consisting in reducing the sulphuric acid contained in the raw extracted mass by introducing sulphuretted hydrogen into said mass and controlling the hardness of the bitumens by determining the amount of sulphuric acid remaining in the acid resins during extraction.

In testimony whereof we have affixed our signatures.

CARL SAUTERMEISTER.
FRIEDRICH WILHELM.